US007684363B2

(12) United States Patent
Zhao et al.

(10) Patent No.: US 7,684,363 B2
(45) Date of Patent: *Mar. 23, 2010

(54) APPARATUS AND METHOD OF CONTROLLING UNSOLICITED TRAFFIC DESTINED TO A WIRELESS COMMUNICATION DEVICE

(75) Inventors: Wen Zhao, Kanata (CA); Thomas Leonard Trevor Plestid, Ottawa (CA); Craig Dunk, Guelph (CA); Muhammad Khaledul Islam, Ottawa (CA); Luis Pablo Estable, Gatineau (CA); William Daniel Willey, San Francisco, CA (US)

(73) Assignee: Research In Motion Ltd., Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/470,896

(22) Filed: May 22, 2009

(65) Prior Publication Data

US 2009/0232055 A1 Sep. 17, 2009

Related U.S. Application Data

(63) Continuation of application No. 10/996,664, filed on Nov. 24, 2004, now Pat. No. 7,545,767.

(60) Provisional application No. 60/527,335, filed on Dec. 5, 2003.

(51) Int. Cl.
*H04W 4/00* (2009.01)
(52) U.S. Cl. ...................... 370/328; 455/466
(58) Field of Classification Search ....................... None
See application file for complete search history.

(56) References Cited

U.S. PATENT DOCUMENTS 6,052,709 A 4/2000 Paul (Continued)

FOREIGN PATENT DOCUMENTS

DE 10114649 A1 10/2002

(Continued)

OTHER PUBLICATIONS

"Radius Extension Guide," Netscape Directory Server, Version 4.11, Sun Microsystems, Inc. (1999).

*Primary Examiner*—Erika A Gary
(74) *Attorney, Agent, or Firm*—Eckert Seamans Cherin & Mellott, LLC; David C. Jenkins, Esquire; Brij K. Agarwal, Esquire

(57) ABSTRACT

An apparatus and method of controlling unsolicited traffic are disclosed herein. The apparatus and method can be applied to wireless communication networks such as CDMA2000, UMTS, GPRS and the like so that traffic which is not solicited by wireless communication devices operating on those networks is not sent over the air needlessly. The present application provides techniques to block unsolicited traffic based on the identity of a user (for example based on International Mobile Station Identity (IMSI), Network Access Identifier (NAI), Mobile Station Internet Services Digital Network Number (MSISDN), Session Initiation Protocol (SIP) Universal Resource Locator (url)) as opposed to techniques that are based on a session or IP address, such as a traditional firewall. In accordance to this application, user identity based techniques are applied to block unsolicited traffic whenever a user has established a data session. Further in accordance with this application, user identity based techniques are persisted across changes in IP address and/or session.

19 Claims, 16 Drawing Sheets

U.S. PATENT DOCUMENTS

| | | |
|---|---|---|
| 7,155,608 B1 | 12/2006 | Malik et al. |
| 7,545,767 B2 * | 6/2009 | Zhao et al. ................ 370/328 |
| 2002/0166068 A1 | 11/2002 | Kilgore |
| 2003/0061508 A1 | 3/2003 | Bhat |
| 2003/0083078 A1 | 5/2003 | Allison et al. |

FOREIGN PATENT DOCUMENTS

| | | |
|---|---|---|
| EP | 1122928 A2 | 8/2001 |
| EP | 1122932 A2 | 8/2001 |
| WO | 99/27726 A1 | 6/1999 |
| WO | 00/49776 A2 | 8/2000 |
| WO | 01/74041 A2 | 10/2001 |
| WO | 02/05514 A1 | 1/2002 |
| WO | 03/007544 A2 | 1/2003 |

* cited by examiner

APPARATUS AND METHOD OF CONTROLLING UNSOLICITED TRAFFIC DESTINED TO A WIRELESS COMMUNICATION DEVICE

CROSS-REFERENCE TO RELATED APPLICATIONS

The instant application is a continuation of U.S. patent application Ser. No. 10/996,664, filed Nov. 24, 2004, now U.S. Pat. No. 7,545,767, entitled "Apparatus and Method of Controlling Unsolicited Traffic Destined to a Wireless Communications Device", which claims the benefit U.S. Provisional Patent Application No. 60/527,335, filed Dec. 5, 2003.

BACKGROUND

1. Technical Field

This application relates to wireless communication techniques in general, and to an apparatus and method of controlling unsolicited traffic destined to a wireless communication device in particular.

2. Related Art

Some wireless communication devices are known to receive unsolicited traffic. For example, a Code Division Multiple Access (CDMA) 2000 wireless communication device operating in simple Internet Protocol (IP) configuration can receive unsolicited IP packets. Although other non-wireless devices are known to receive unsolicited traffic, techniques traditionally used with non-wireless devices may be inappropriate as there is a significant waste of resources, both in the wireless network, as well as in a wireless communication device, whenever unsolicited traffic gets sent over the air interfaces.

One technique that is known, which partly addresses this problem, involves using a private addressing scheme. However, even if a private addressing scheme is used, this technique may not prevent unsolicited traffic initiated from within the private address space from reaching the wireless communication device. Furthermore, this technique may be unacceptable if a public address is desired, as is the case for example with certain CDMA2000 wireless carriers. Another technique that is known, which partly addresses this problem, involves using a firewall within the wireless communication network. However, firewall rules may have to be manually configured, and may be ineffective if the rules depend on the wireless communication devices addresses, which may be subject to change due to mobility. For example, in the case of CDMA2000, IP address can be dynamically assigned and reused, which may render the firewall rules ineffective for the wireless communication device.

Generally speaking there are three categories of unsolicited traffic which require screening: (a) Stale Session Unsolicited Traffic—When a mobile device stops using an IP address A without first terminating communications previously established to other servers, packets may continue to be sent to the same IP address A. Examples are Virtual Private Network (VPN) packets, Peer-to-Peer (P2P) file sharing, spyware and many more. Such packets often are sent continuously to the device. Unsolicited traffic can arrive via a stale IP session when a second mobile device acquires IP address A, and starts receiving packets from stale IP session(s), the unsolicited traffic originally intended to reach the first mobile device; and (b) Inter-subscriber Intra-subnet Unsolicited Packets—Subnet constrained broadcasts or serial unicast from one mobile to another are effectively unsolicited packets received from other subscriber served by the same operator (e.g. worms exploiting subnet discovery protocols such as Internet Control and Management Protocol (ICMP) or Simple Service Discovery Protocol (SSDP); and (c) malicious packets.

A mobile device may not be able to block a network from sending packets, since a connection to the network or a call must be established and IP data examined prior to a packet's validity being determined. Packets from Stale IP sessions can be considered unsolicited packets. There are network and mobile device impacts which arise from unsolicited packets. First, the network impact is such that unsolicited traffic means inefficient use of network resources (sending undesired data to users), resulting in data delivery delays for other users as well as the possibility of complete network unavailability for voice or data service for many users within a geographic area. Second, the device impact is such that unsolicited traffic means a mobile device may be paged to set up calls on an ongoing basis, resulting in very rapid battery drain as well as erroneous accounting of data usage records for a particular data capable mobile device. Thirdly, receiving undesired unsolicited traffic can be irritating to customers.

BRIEF SUMMARY OF THE INVENTION

In order to overcome the negative impacts highlighted above, the present application provides an apparatus and method of controlling unsolicited traffic which can be applied to wireless communication networks such as CDMA2000, Universal Mobile Telecommunications System (UMTS), General Packet Radio Service (GPRS) and the like so that traffic which is not solicited by wireless communication devices operating on those networks is not sent over the air needlessly. The present application provides techniques to block unsolicited traffic based on the identity of a user (for example based on International Mobile Station Identity (IMSI), Network Access Identifier (NAI), Mobile Station Internet Services Digital Network Number (MSISDN), Session Initiation Protocol (SIP) Universal Resource Locator (url)) as opposed to techniques that are based on a session or IP address, such as a traditional firewall. In accordance to this application, user identity based techniques are applied to block unsolicited traffic whenever a user has established a data session. Further in accordance with this application, user identity based techniques are persisted across changes in IP address and/or session.

According to a first aspect of the present application, there is provided in a wireless communication network, the wireless communications network comprising an unsolicited traffic controller (UTC) coupled to a packet data network and a plurality of wireless communication devices, a method of controlling traffic destined to a first one of the plurality of wireless communication devices comprising the steps of: storing a set of traffic control rules associated with the first one of the plurality of wireless communication devices; determining a first identify corresponding to a user of the first one of the plurality of wireless communication devices; determining that a first packet received from the packet data network is destined to the first one of the plurality of wireless communication devices; selecting the stored traffic control rules associated with the determined first identity; applying the selected traffic control rules to determine if the first packet is unsolicited by said user; and preventing the first packet from being sent to the first one of the plurality of communication devices if the first packet is determined to be unsolicited.

According to a second aspect of the present application there is provided a computer readable medium having stored thereon, computer executable instructions which when executed by a processor in an unsolicited traffic controller (UTC), cause the UTC to: store a set of traffic control rules associated with a specified one of a plurality of wireless communication devices; determine an identify corresponding to a user of the specified one of the plurality of wireless communication devices; determine that a first packet received from a packet data network is destined to the specified one of the plurality of wireless communication devices; select the stored set of traffic control rules associated with the determined identity; apply the selected traffic control rules to determine if the first packet is unsolicited by the user; and prevent the first packet from being sent to said specified one of the plurality of communication devices if the first packet is determined to be unsolicited, wherein the UTC is resident in a wireless communications network and coupled to said packet data network and said plurality of wireless communication devices.

According to a third aspect of the present application there is provided a carrier wave embodying a computer data signal representing sequences of instructions which, when executed by a processor, cause the processor to: store a set of traffic control rules associated with a specified one of a plurality of wireless communication devices; determine an identify corresponding to a user of the specified one of the plurality of wireless communication devices; determine that a first packet received from a packet data network is destined to the specified one of the plurality of wireless communication devices; select the stored set of traffic control rules associated with the determined identify; apply the selected traffic control rules to determine if the first packet is unsolicited by the user; and prevent the first packet from being sent to the specified one of the plurality of communication devices if the first packet is determined to be unsolicited, wherein the processor is an unsolicited traffic controller (UTC), and wherein the UTC is resident in a wireless communications network and coupled to said packet data network and said plurality of wireless communication devices.

According to a fourth aspect of the application, there is provided in a wireless communication network, an apparatus for controlling unsolicited traffic destined to a specified one of a plurality wireless communication devices, the apparatus comprising: a first interface configured to receive traffic from a packet data network; a second interface configured to send traffic to the specified one of the plurality of wireless communication devices; a first storage medium having stored thereon computer executable instructions representing a set of traffic control rules; and an unsolicited traffic controller (UTC) communicating with the first and second interfaces and the first storage medium, wherein the UTC determines an identity assigned to said specified one of said plurality of wireless communication devices, and executes the computer executable instructions to selectively block said unsolicited traffic received over the first interface from being sent over the second interface to the specified one of the plurality wireless communication devices.

Other aspects and features of the present application will be apparent to those ordinarily skilled in the art upon review of the following description of the specific embodiments of an apparatus and method of controlling unsolicited traffic destined to a wireless communication device.

BRIEF DESCRIPTION OF THE DRAWINGS

Embodiments of the present application will now be described, by way of example only, with reference to the attached figures, wherein.

Same reference numerals are used in different figures to denote similar elements.

DETAILED DESCRIPTION

Figure 1:
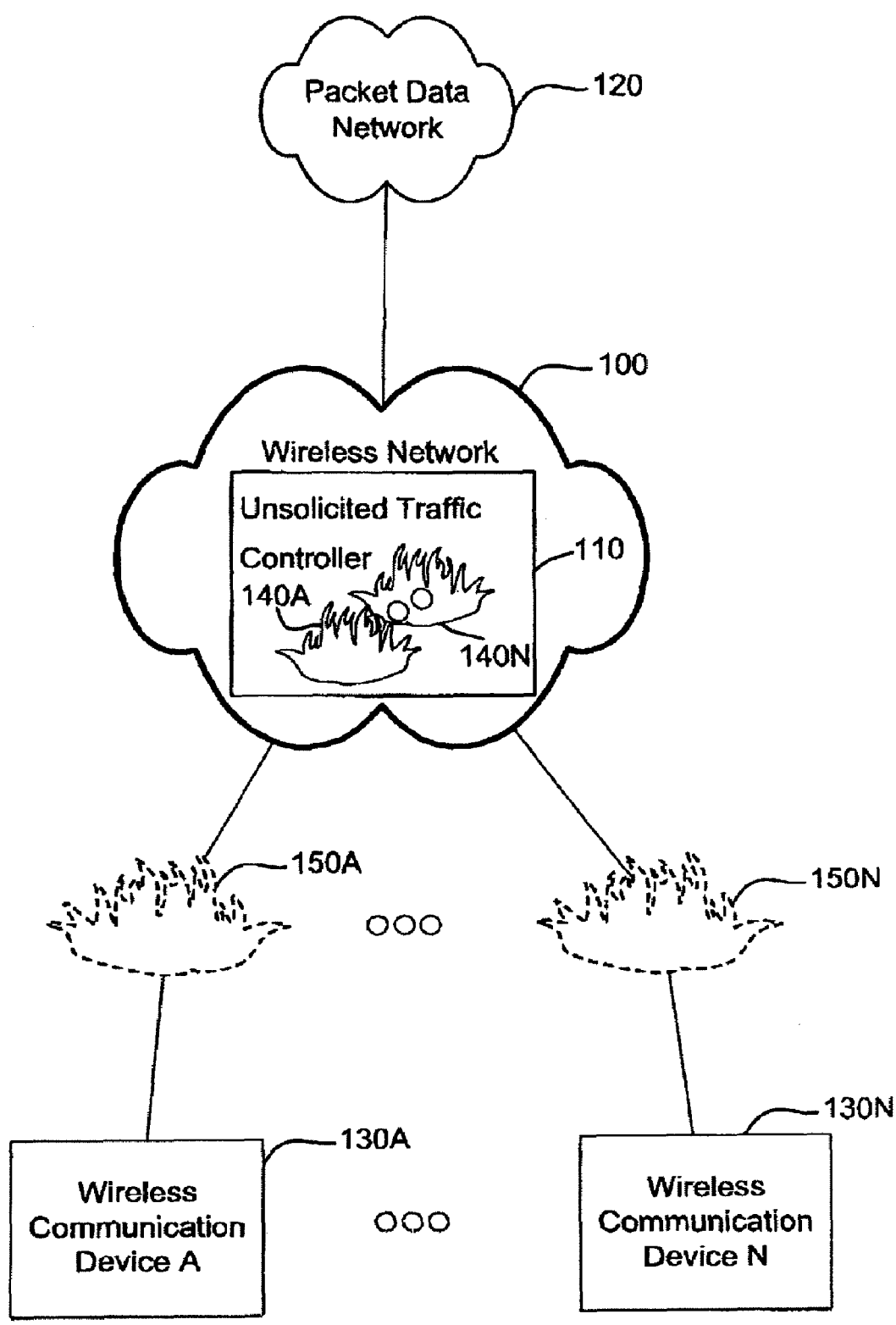
FIG. 1 is a block diagram illustrating a wireless network including an embodiment of the unsolicited traffic controller (UTC), provided in accordance with the present application.

Referring now to the drawings, FIG. 1 is a block diagram illustrating a wireless network including an embodiment of an unsolicited traffic controller (UTC), provided in accordance with the present application. The block diagram shows a wireless network 100 coupling a packet data network 120 with wireless communication devices 130A . . . 130N, and coupling wireless communication devices to one another, thereby enabling traffic to flow to and from packet data network 120 from and to wireless communication devices 130A . . . 130N, and enabling traffic to flow to and from one wireless communication device 130A to and from another wireless communication device 130N.

Wireless network 100 includes an unsolicited traffic controller 110, provided in accordance with the present application, the purpose of which is to affect the manner that the coupling between wireless communication devices 130A . . . 130N to each other and to packet data network 120 occurs, so as to limit unsolicited traffic destined to wireless communication devices 130A ... 130N. Specifically, unsolicited traffic controller 110 includes a set of firewall-like rules 140A ... 140N, each of which corresponds to a specific wireless communication device 130A ... 130N, so that their combined effect is that the over the air interfaces behave as if they were each substantially firewalled 150A ... 150N.

Various embodiments of an unsolicited traffic controller are envisaged, each adapted to the particular requirements of a specific wireless network. For example, in an embodiment adapted to a CDMA wireless network, the unsolicited traffic controller is preferably located in at least one Packet Data Serving Node (PDSN) of the wireless network. Alternatively, in an embodiment adapted to a GPRS wireless network, the unsolicited traffic controller is preferably located in at least one Serving GPRS Support Node (SGSN), further preferably in at least one Gateway GPRS Support Node (GGSN). The choice of where to locate the unsolicited traffic controller is guided by the principle that it should have access to all traffic destined to the wireless devices so as to control the flow of unsolicited traffic. In this regard, an unsolicited traffic controller can be adapted to operate with any given wireless network in view of the present application.

The unsolicited traffic controller 110 of FIG. 1 can be configured for co-operation with GPRS. GPRS is specified for example by 3GPP. A push initiator is located within packet data network 120. Wireless communication devices 130A thru 130N are user equipment, and each includes at least one user agent, and a push recipient. Wireless network 100 is a public land mobile network, and includes a push function as well as push subscription profiles corresponding to each of the users of the user equipments. The unsolicited traffic controller 110 in this embodiment operates as a user based firewall by controlling unsolicited traffic based on the push subscription profiles of the users of the user equipment: depending on configuration, it is envisaged that the unsolicited traffic controller 110 controls traffic based on IMSI, NAI, MSISDN or SIP url, for example.

The remainder of this description and drawings will use IP packets and IP addresses for exemplary purposes only, as the techniques shown herein can be applied to many alternative forms of communication. For example, the technique could be applied to voice, e-mail, hyper text transfer protocol (http), file transfer protocol (ftp), multimedia messaging service (MMS) and short messaging service (SMS).

FIGS. 2 to 8 define various techniques for unsolicited traffic control. As those skilled in the art will appreciate, traffic can be controlled by implicit, explicit or dynamic rules or a combination of such rules. With respect to the physical structure of an unsolicited traffic controller, FIG. 16, which will be discussed later, describes an exemplary embodiment. Most notably, the unsolicited traffic controller stores the rules (see element 1670 in FIG. 16) which are used to selectively block packets.

Figure 2:
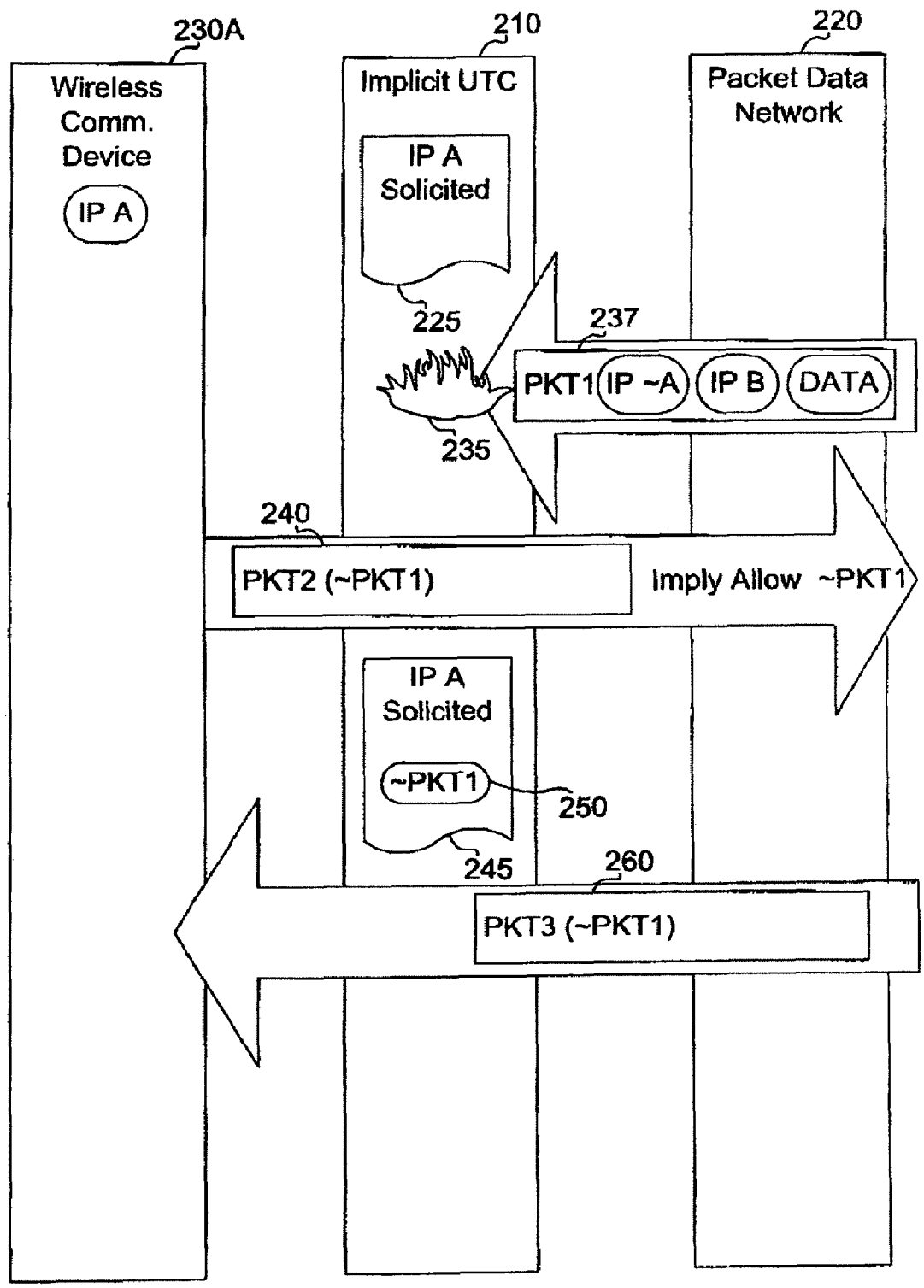
FIG. 2 is an interaction diagram illustrating the technique of implicit unsolicited traffic control, provided in accordance with the present application.

Turning now to FIG. 2, an interaction diagram illustrating the technique of implicit unsolicited traffic control, provided in accordance with the present application is depicted. The interaction diagram shows the interactions between a wireless communication device 230A, an implicit unsolicited traffic controller 210, and a packet data network 220.

Before describing this first interaction diagram further, it is important to describe some common aspects of notation that are used in this and other interaction diagrams of the present application. Time flows generally downwards in this interaction diagram, as well as in the other interaction diagrams of the present application. Furthermore, the tilde (~), as used in the drawings, in this description, is meant to be shorthand for "substantially like". Thus IP ~A is meant to denote all addresses which are substantially like IP A for some specific purpose. For example, the notation IP ~A when used to qualify IP addresses which can reach a wireless device having IP A, this includes IP A itself, as well as broadcast addresses, anycast addresses and multicast addresses which would normally reach IP A in the absence of the techniques of the present application. The same tilde (~) notation is used to denote packets. For example, if PKT1 has destination address IP A, source address IP B, and data, then ~PKT1 is meant to denote packets which are substantially like PKT1 for some specific purpose, e.g. where a substantial similarity can be found between the source, destination, and/or data between the two packets. For instance, in TCP/IP and UDP/IP packets, data in one packet can be considered to be substantially like data in another packet if port numbers or socket numbers are substantially similar. As another example, for ICMP/IP packets, data can include protocol numbers.

Operationally, wireless communication device 230A is currently assigned address IP A. Implicit UTC 210 keeps track of what kind of traffic is considered solicited for IP A. This is shown at two times in the IP A Solicited blocks. Initially, IP A Solicited 225 does not contain any information with respect to the packets illustrated in FIG. 2. Consequently, when PKT 237 is destined to an address like IP A, i.e. IP ~A, implicit UTC 210 advantageously blocks 235 PKT1 237. Further advantageously, implicit UTC 210 recognizes that wireless communication device 230A sent out PKT2 (~PKT1) 240, and consequently updates the list IP A Solicited 245 to include ~PKT1 250, so that when PKT3 (~PKT1) 260 is destined to wireless communication device 230A, it is not blocked.

Figure 3:
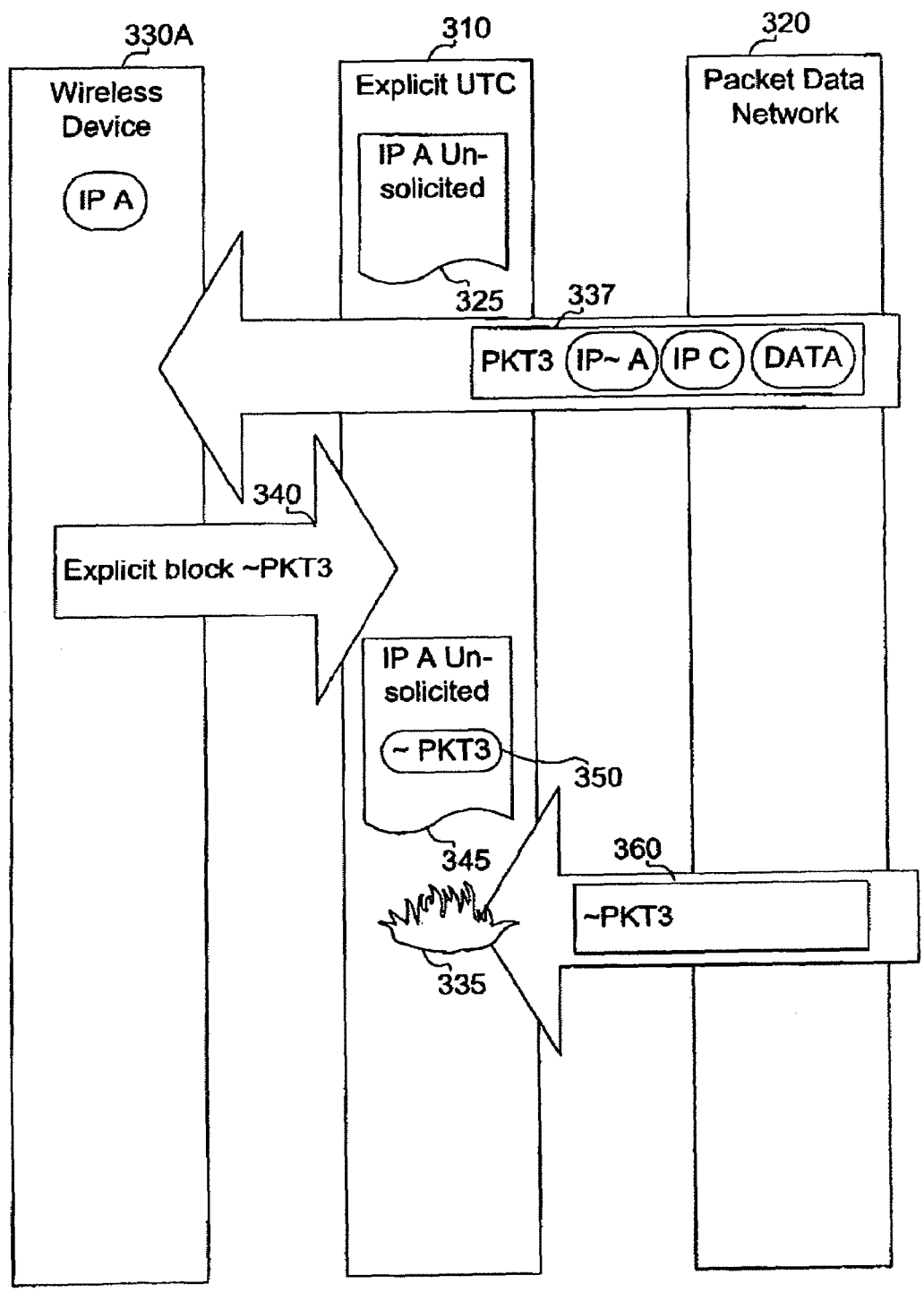
FIG. 3 is an interaction diagram illustrating the technique of explicit unsolicited traffic control, provided in accordance with the present application.

FIG. 3 is an interaction diagram illustrating the technique of explicit unsolicited traffic control, provided in accordance with the present application. Turning now to FIG. 3, similarly to FIG. 2, wireless communication device 330A is currently assigned address IP A. Explicit UTC 310 keeps track of what kind of traffic is considered unsolicited for wireless communication device 330A. This is shown at an initial time prior to explicit block 340, in the list IP A unsolicited block 325 and at a time subsequent to explicit block 340, in the list IP A unsolicited block 345. Initially, the list IP A Unsolicited 325 does not contain any information with respect to the packets illustrated in FIG. 3, and in particular PKT3 337. Consequently, when PKT3 337 is destined to an address like IP A, i.e. ~IP A, Explicit UTC 310 advantageously allows PKT3 337 to go through. After wireless communication device 230A receives PKT3 337, it sends an Explicit Block ~PKT3 message 340 to Explicit UTC 310. Consequently, explicit UTC 310 updates the list IP A Unsolicited 345 so as to include ~PKT3 350, so that when a packet like PKT3, i.e. ~PKT3 360, is destined to wireless communication device 330A, it is blocked 335.

In an alternate embodiment, wireless communication device 330A may also send an explicit unblock ~PKT3 message to Explicit UTC 310 at a later time so that Explicit UTC 310 updates IP A unsolicited 345 to exclude ~PKT3 350. At any time subsequent to the unblock ~PKT3, if a packet like PKT3, i.e. ~PKT3, is destined to wireless communication device 330A, it would be let through.

In yet another embodiment, the explicit UTC aspect of FIG. 3 can be combined with the implicit UTC aspect of FIG. 2. If wireless communication device 330A sends a packet ~PKT3 to the Packet Data Network 320, even though explicit UTC 310 accepts explicit blocks and unblocks, it can also interpret ~PKT3 as an implicit unblock and consequently updates the IP A Unsolicited 345 to remove ~PKT3 350, so that when an other packet ~PKT3 is destined to wireless communication device 330A, it is no longer blocked.

Figure 4:
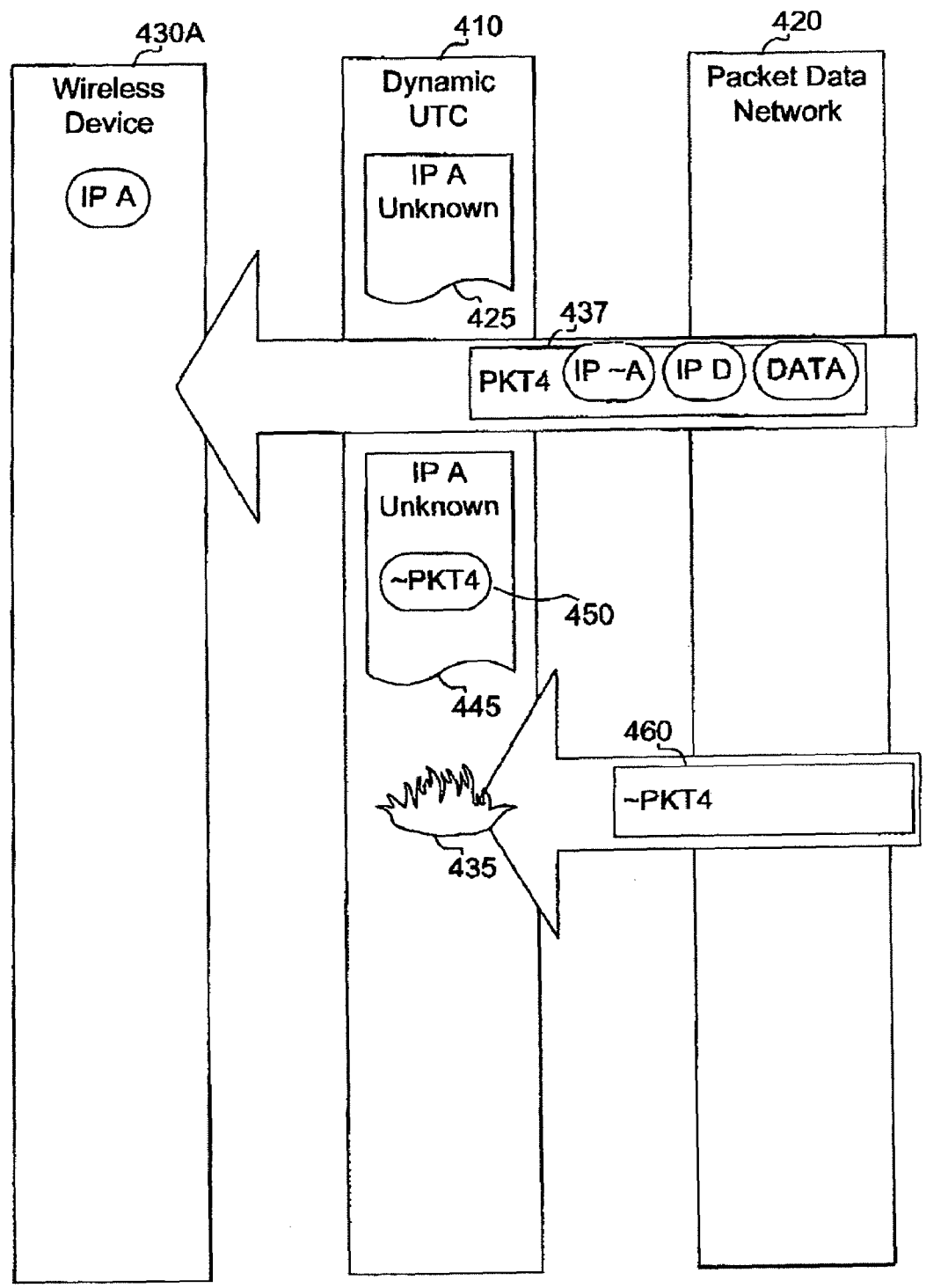
FIG. 4 is an interaction diagram illustrating the technique of dynamic unsolicited traffic control, provided in accordance with the present application.

FIG. 4 is an interaction diagram illustrating the technique of dynamic unsolicited traffic control, provided in accordance with the present application. Turning now to FIG. 4, similarly to FIGS. 2-3, wireless communication device 430A is currently assigned address IP A. Dynamic UTC 410 keeps track of what kind of traffic is considered unknown for A. This is shown at two times in the A unsolicited blocks. Initially, the list IP A Unknown 425 does not contain any information with respect to the packets illustrated in FIG. 4, and in particular PKT4 437. Consequently, when PKT4 437 is destined to an address like IP A, i.e. IP~A, Dynamic UTC 410 advantageously allows PKT4 437 to go through once after which Dynamic UTC 410 updates A Unknown 445 to include ~PKT4, so that when a subsequent packet like PKT4, i.e. ~PKT4 460 is destined to wireless communication device 430A, it is blocked 435. In an alternative embodiment, it is envisaged that the blocking operation allow for a predetermined number of packets matching a listing in IP A unknown before blocking subsequent packets.

In other alternative embodiments, wireless communication device 430A can also send either an explicit or implicit unblock to Dynamic UTC 410 at a later time so that Dynamic UTC 410 updates list IP A Unknown 445 to allow packets like PKT3, i.e. ~PKT4 450. Thus, when a packet like PKT, i.e. ~PKT4, is destined to wireless communication device 230A, it is not blocked.

Figure 5:
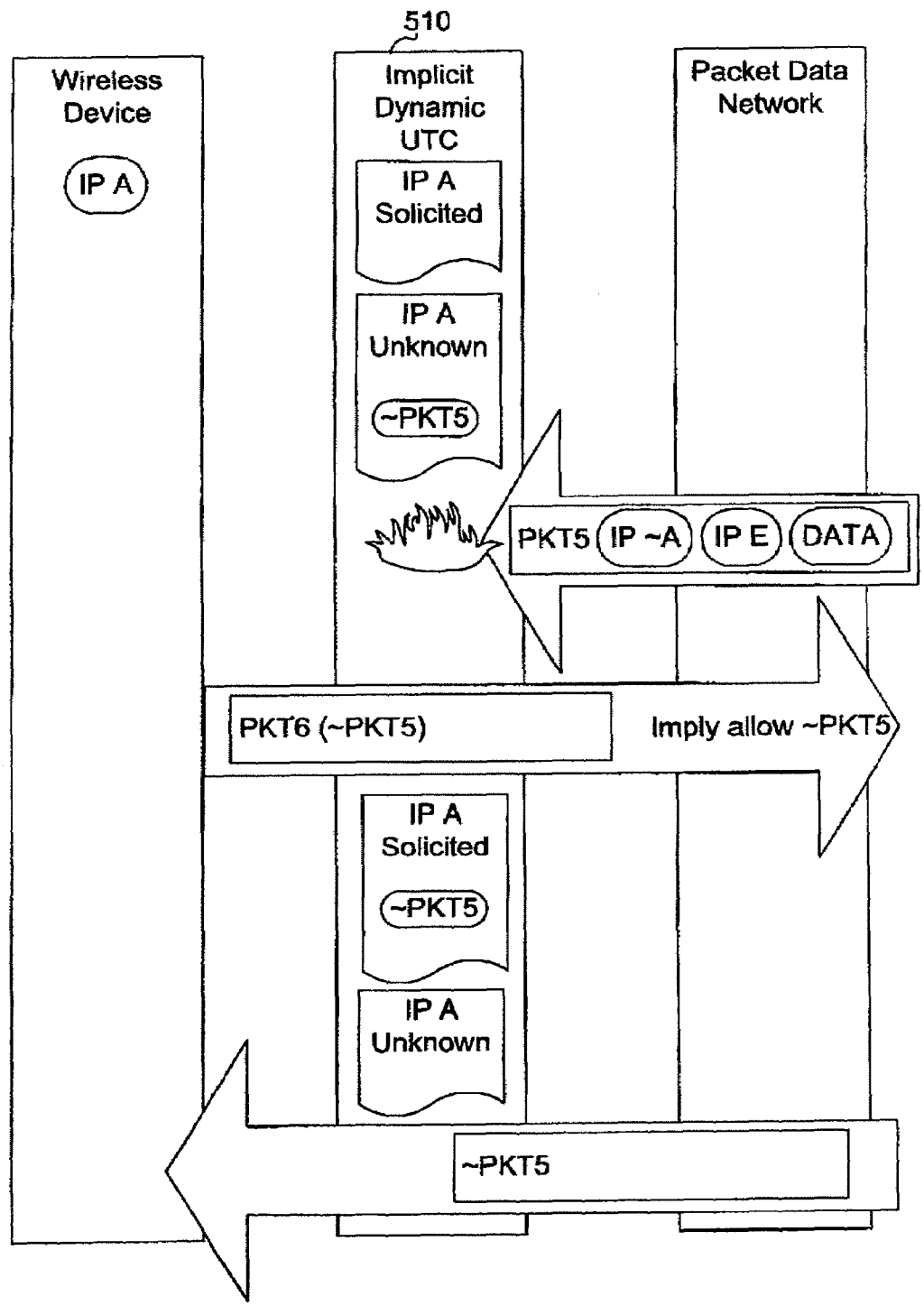
FIGS. 5-8 are interaction diagrams illustrating the combination of the techniques shown in FIGS. 2-4.

FIG. 5 shows an embodiment of an UTC 510 that combines the implicit aspect of the UTC 210 of FIG. 2 with the dynamic aspect of the UTC 410 of FIG. 4.

Figure 6:
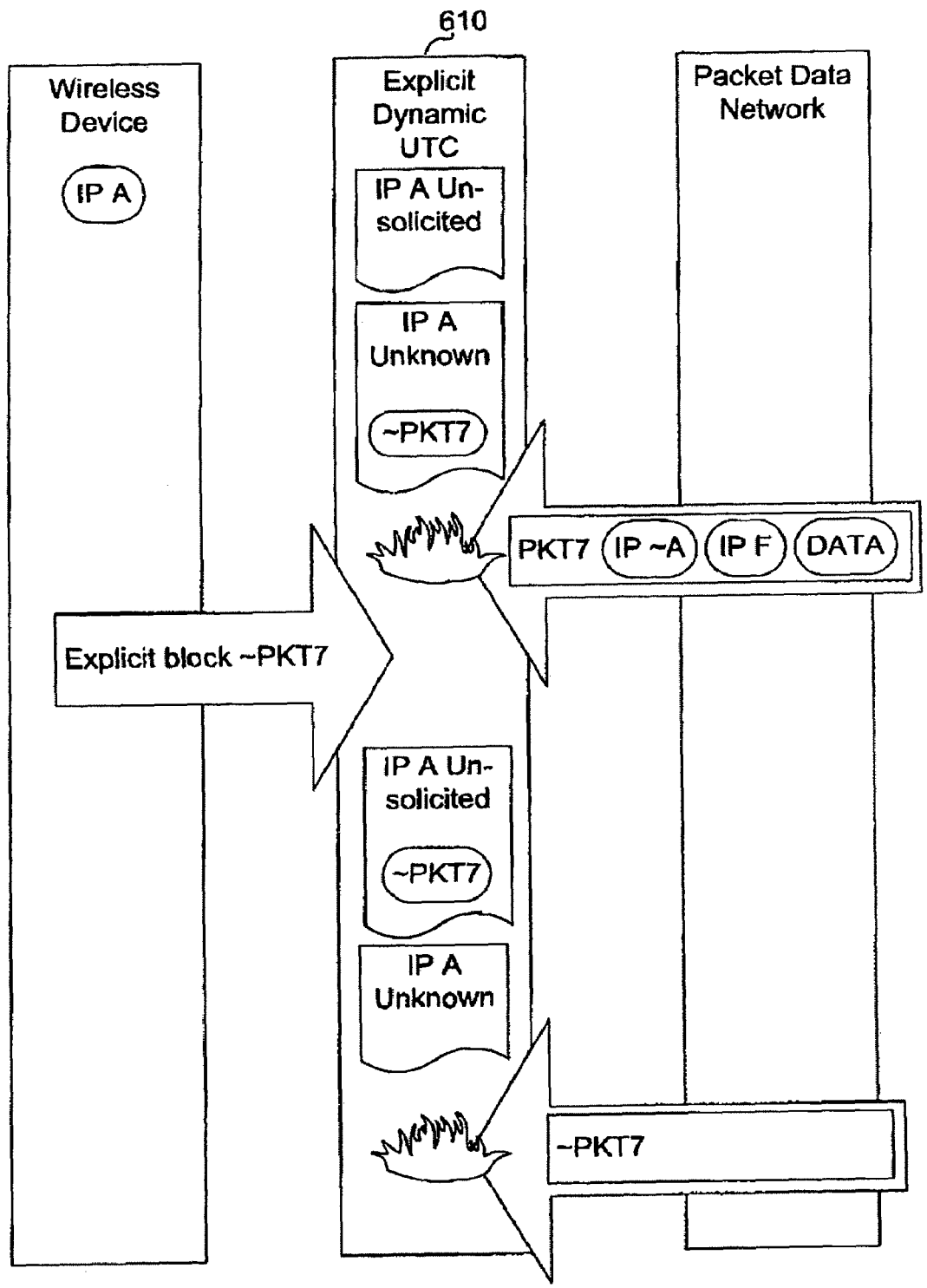

FIG. 6 shows an embodiment of an UTC 610 that combines the explicit aspect of UTC 310 of FIG. 3 with the dynamic aspect of the UTC 410 of FIG. 4.

Figure 7:
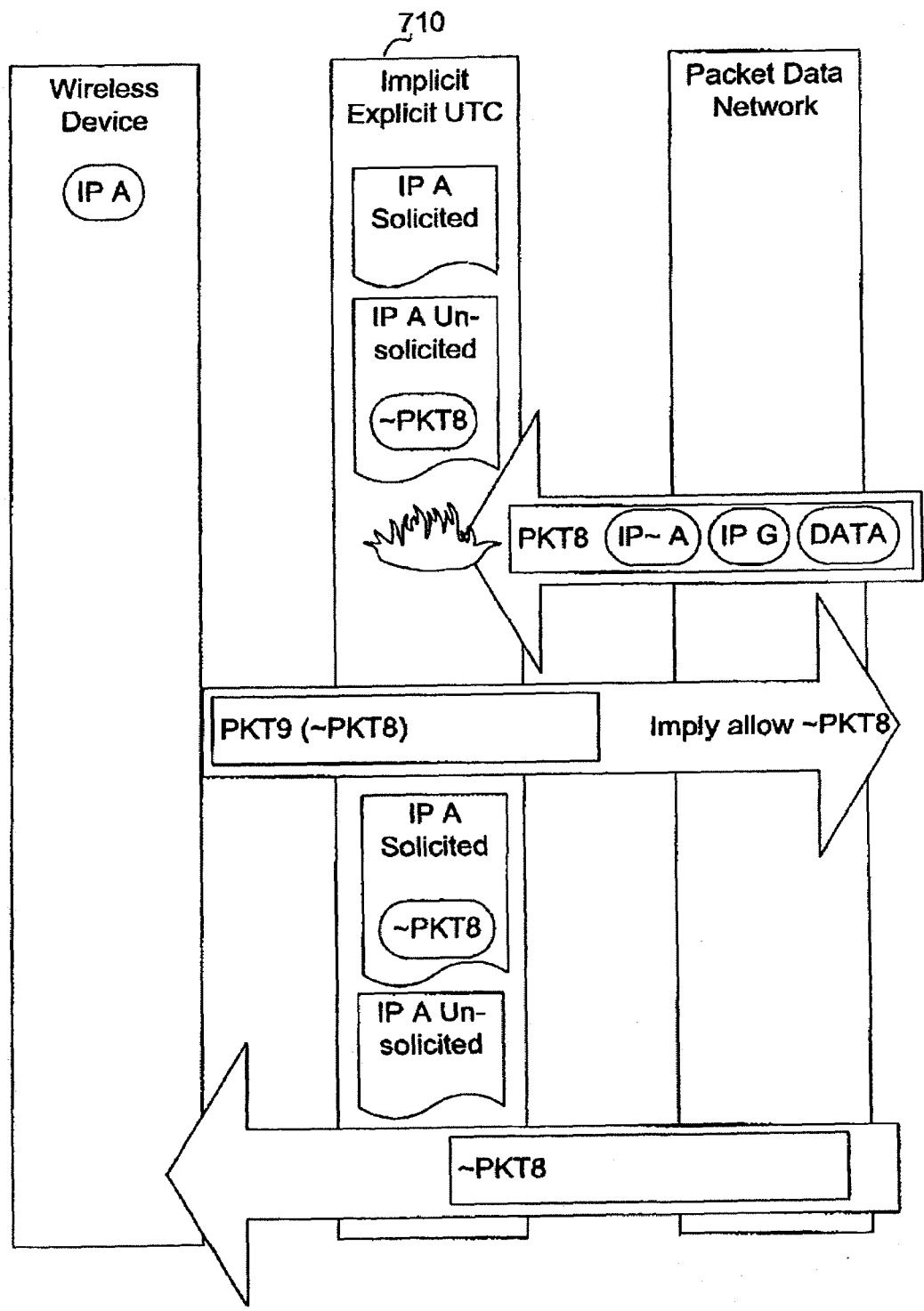
Figure 8:
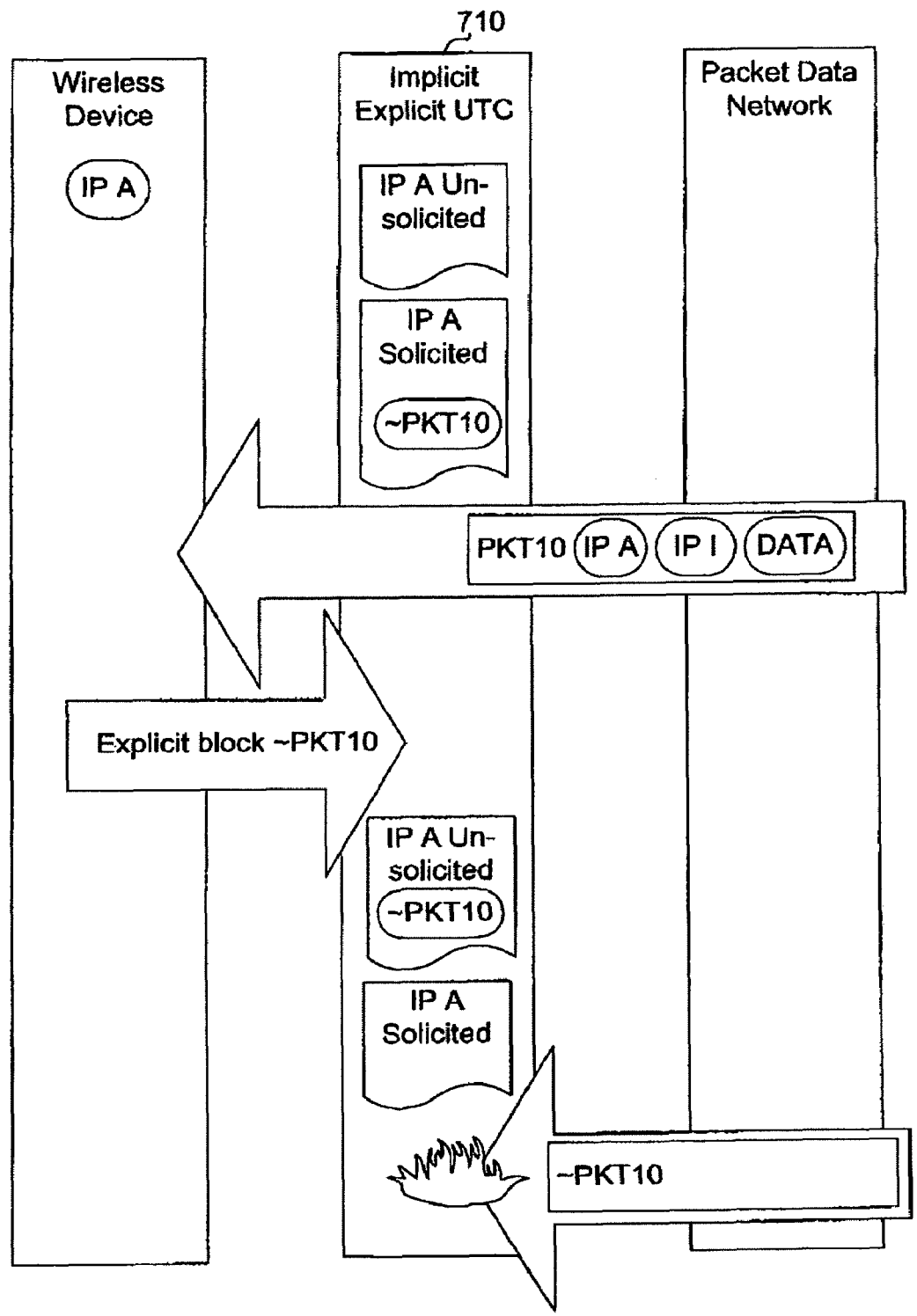

FIGS. 7-8 shows an embodiment of an UTC 710 that combines the implicit aspect of the UTC 210 of FIG. 2 with the explicit aspect of UTC 310 of FIG. 3.

The lists utilized to categorize the various nature of packets in relation to a particular wireless device have thus far been kept separate in order to enable the reader to better understand their operation. However, as FIGS. 2-8 demonstrate that introducing the appropriate lists into the UTC and following the appropriate procedures for updating those lists can combine various aspects of these UTCs, such as the implicit, explicit, and dynamic aspects. Therefore, for the remainder of this document and in the appended claims, the term rules will be used as a generic for the various lists utilized by a UTC to keep track of a wireless device, such as but not limited to the solicited, unsolicited, and unknown lists used thus far.

Figure 9:
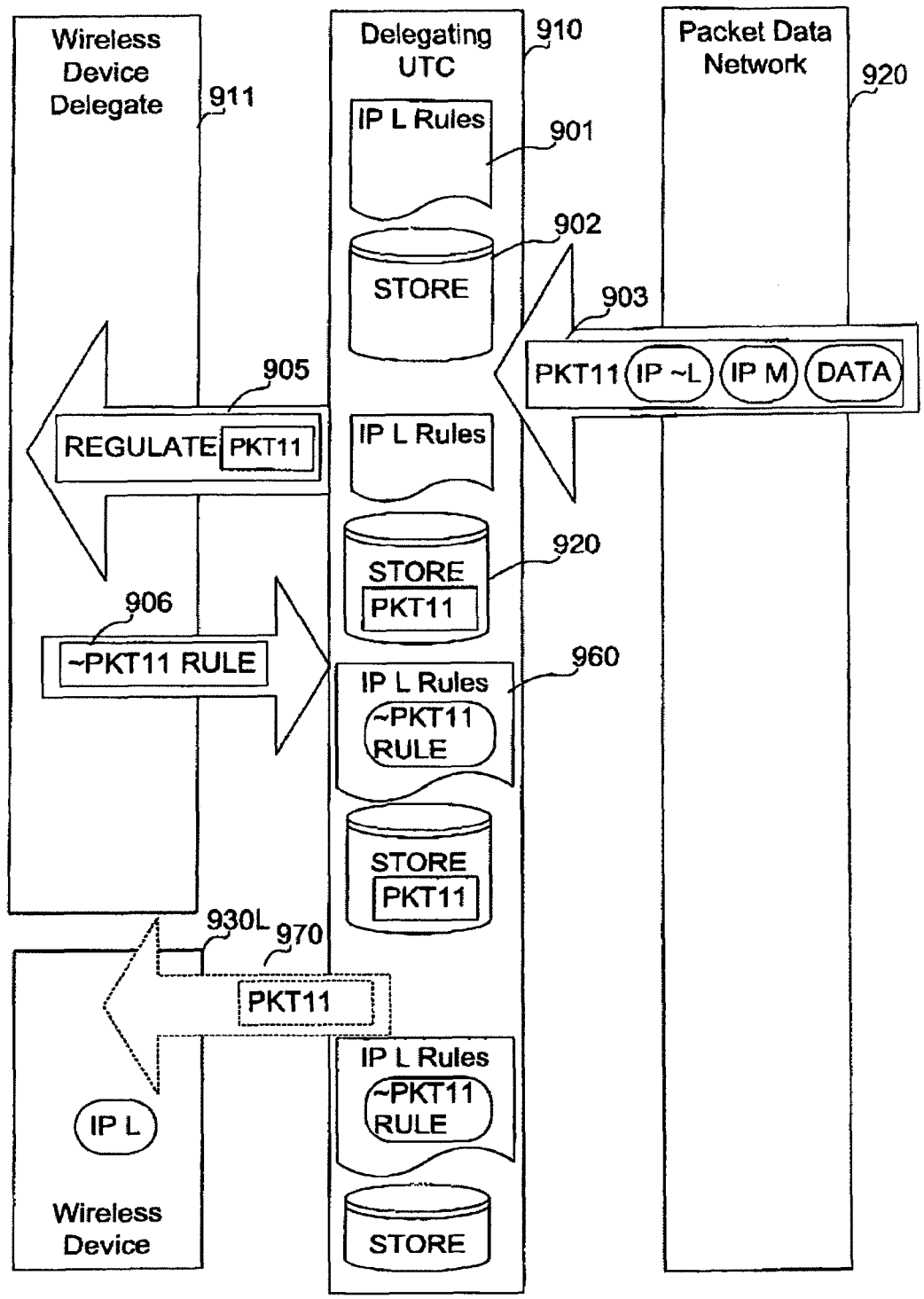
FIG. 9 is an interaction diagram illustrating the technique of delegating unsolicited traffic control, provided in accordance with the present application.

FIG. 9 is an interaction diagram illustrating the technique of delegating unsolicited traffic control, provided in accordance with the present application. Turning to FIG. 9, initially, a UTC 910 does not contain any IP L rules 901 for wireless communication device 930L, which as illustrated in FIG. 9 currently has address IP L. When PKT11 903 arrives, UTC 910 sends PKT11 in a regulation message 905 to wireless device delegate 911 and at substantially the same time stores a copy of the packet in storage 920, which was initially empty 902. After receiving PKT11, wireless device delegate 911 forms PKT11 rule 906 and sends it back to UTC 910 in response to the regulation message 905. UTC 910 updates the rules 960 for wireless communication device 930L accordingly. If the rule for PKT11 is such that PKT11 903 would be allowed to go though to wireless communication device 930L, UTC 910 forwards 970 a copy of stored PKT11 to wireless communication device 930L. Conversely if the rule for PKT11 is such that PKT11 903 is not allowed to go to wireless communication device 930L, then it is not forwarded. In the drawing, the conditional aspect of the forwarding 970 is illustrated by using a dotted line to represent the message 970.

Figure 10:
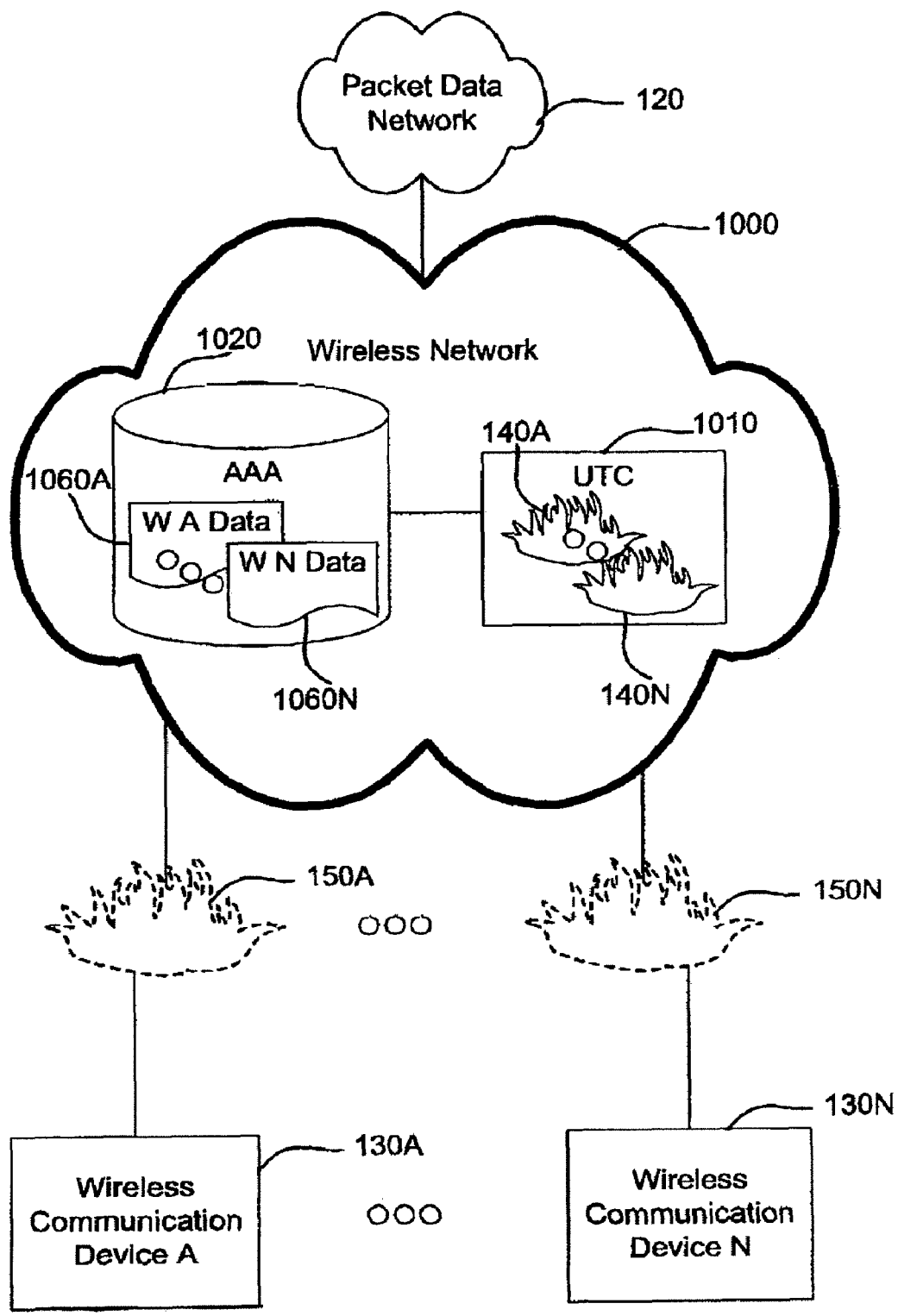
FIG. 10 is a block diagram illustrating a wireless network including an embodiment of a UTC, provided in accordance with the present application.

FIG. 10 is a block diagram illustrating a wireless network including an embodiment of an unsolicited traffic controller, provided in accordance with the present application. Compared with FIG. 1, FIG. 10 further details wireless network 1000 showing the cooperation between UTC 1010 and an Authentication, Authorization and Accounting server AAA 1020. AAA 1020 manages subscriber information of wireless devices 130A-130N as illustrated by records WA Data 1060A through W N Data 1060N. An example of AAA is a RADIUS server.

Figure 11:
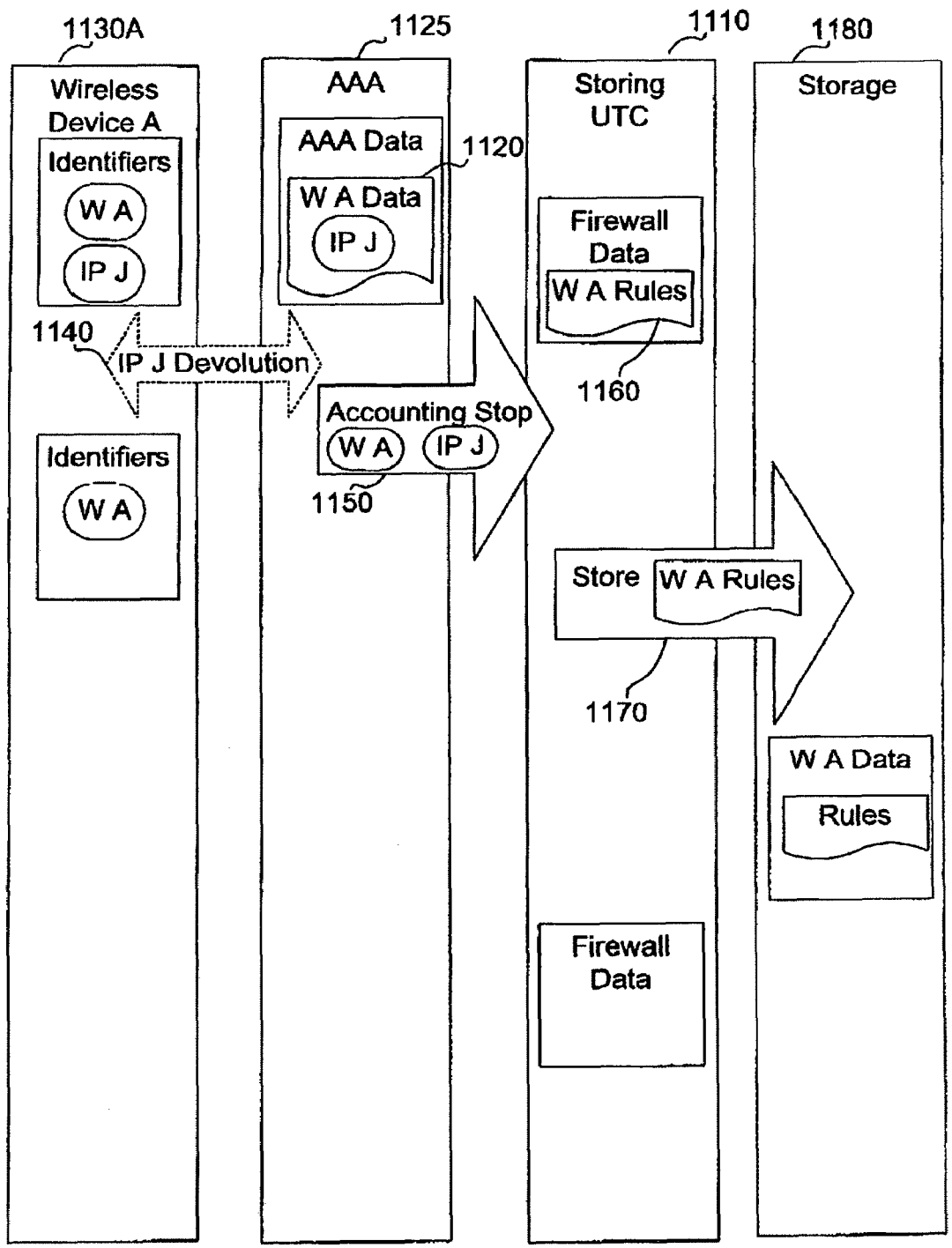
FIG. 11 is an interaction diagram illustrating the UTC behavior when a wireless communication device ceases operation, provided in accordance with the present application.

FIG. 11 is an interaction diagram illustrating the UTC behavior when a wireless communication device ceases operation, provided in accordance with the present application. Turning now to FIG. 11. A wireless communication device A 1130A with identifier WA is assigned address J. A device profile 1120 is created in AAA 1125. When the address J assigned to the wireless communication device A is devolved 1140, AAA sends a message that substantially indicates that device A data is inactive, such as Accounting Stop message 1150 to storing UTC 1110. UTC 1110 identifies the UTC rules 1160 associated with wireless communication device 1130A according to the identifier WA and address J assigned to that wireless communication device. UTC 1110 then stores 1170 the firewall rules associated with wireless communication device 1130A to a storage device 1180 for later retrieval.

Figure 12:
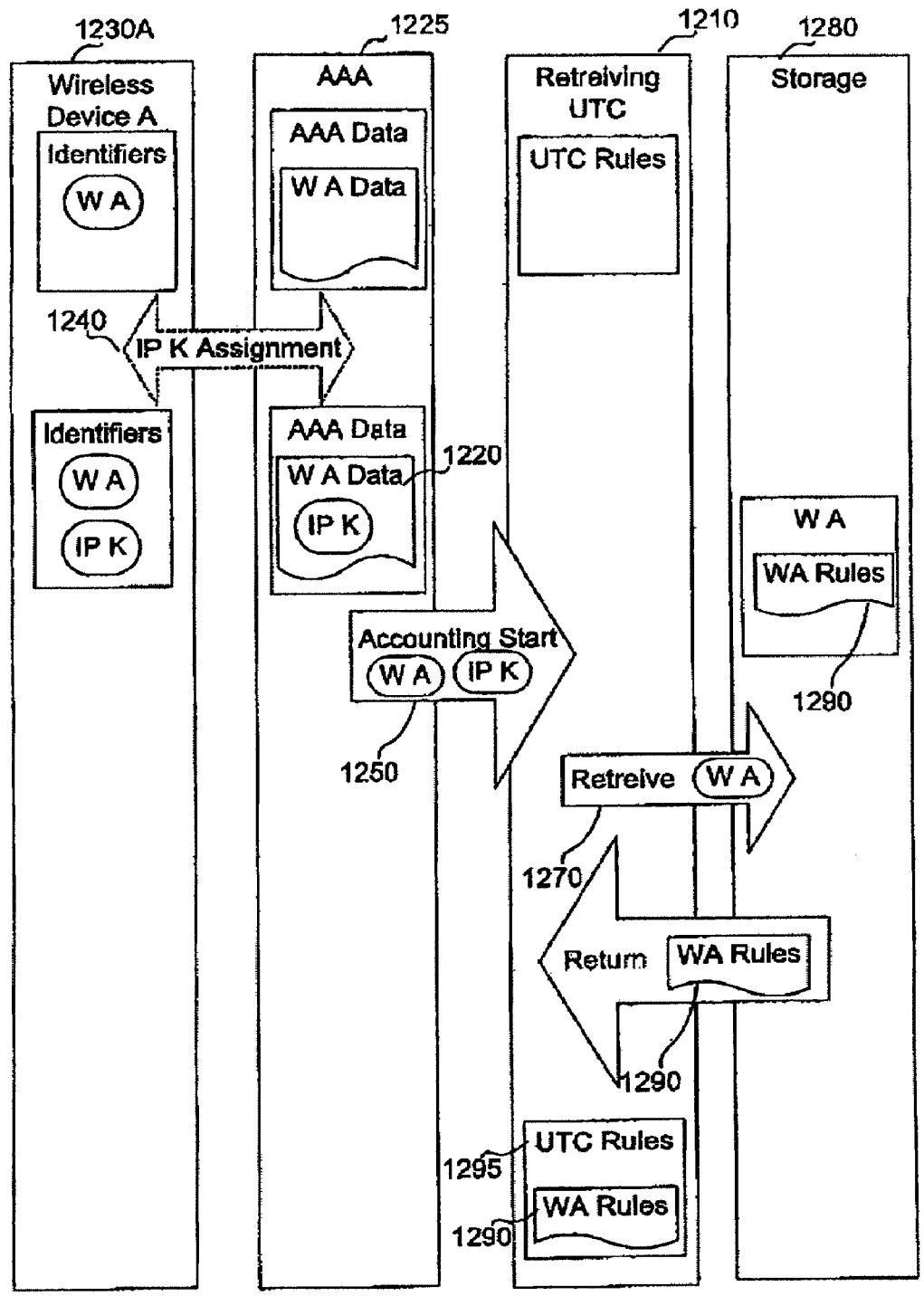
FIG. 12 is an interaction diagram illustrating the UTC behavior when a previously active wireless communication device is becomes active again, provided in accordance with the present application.

FIG. 12 is an interaction diagram illustrating the UTC behavior when a previously inactive wireless communication device becomes active again, provided in accordance with the present application. Turning to FIG. 12. initially the wireless communication device 1230A with identifier WA has no address, and then is assigned 1240 address K. AAA 1225 sends a message that substantially indicates that device A data is active, such as Accounting Start message 1250, to retrieving UTC 1210. UTC 1210 retrieves 1270 the stored UTC rules 1290 for device A from the storage 1280 and updates UTC data 1295 with rules 1290 to apply to address K and starts functioning on behalf of wireless communication device 1230A with address K.

Figure 13:
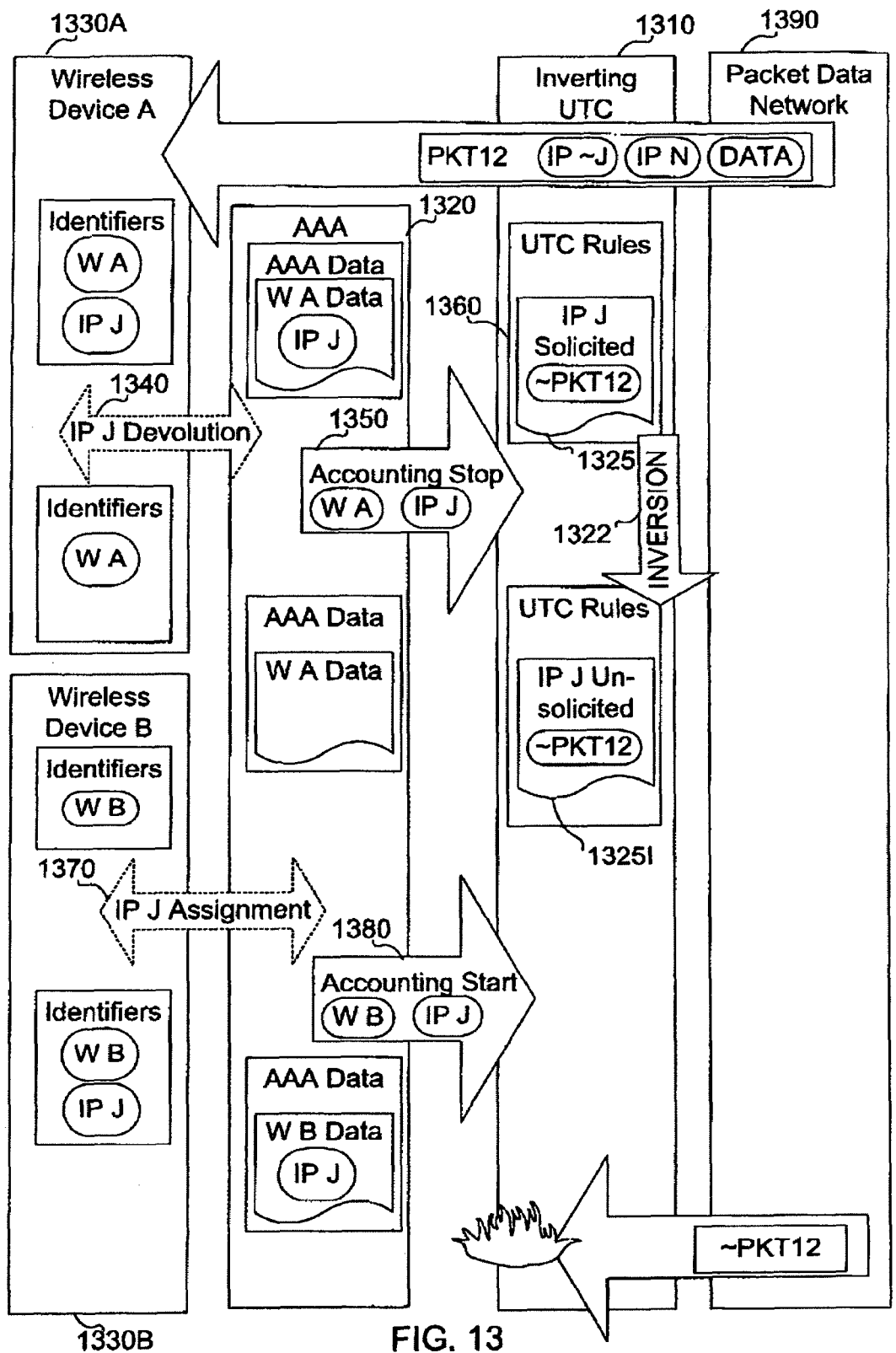
FIG. 13 is an interaction diagram illustrating the interaction when an address assigned to a wireless communication device is devolved and re-assigned to another wireless communication device, provided in accordance with the present application.

FIG. 13 is an interaction diagram illustrating the technique of UTC rule inversion when an address assigned to a wireless communication device is re-assigned to another wireless communication device, provided in accordance with the present application. Turning to FIG. 13, a wireless communication device A 1330A with identifier WA initially is assigned address J. UTC 1310 holds the UTC rules 1360 on behalf of wireless communication device A 1330A. As shown in the drawing, according to the rules currently in effect for WA, PKT12 is allowed to go through and reach wireless communication device A 1330A. However, at a later time wireless communication device A 1330A devolves address J back to the AAA 1320. Upon devolution of IP J 1340, AAA 1320 sends a message that substantially indicates that device A data is inactive, such as Accounting Stop 1350, to UTC 1310. UTC 1310 inverts the IP J solicited rules 1325 portion of the UTC rules 1360. Since this portion of the rules was related to wireless communication device A 1330A, the inversion 1322 ensures that when wireless communication device 1330B becomes active, and is assigned 1370 IP address J, even before AAA 1320 sends a message substantially indicating that wireless device B data is active, such as Accounting Start message 1380 to UTC 1310, UTC 1310 advantageously blocks all packets which were considered solicited by wireless device A 1330A. The inverted rules 1325I thus ensure that, if wireless device A was using VPN through packet data network 1390 for example, and did not terminate VPN before devolution of IP J 1340, no unsolicited packets, such as ~PKT12, left over from the stale VPN session will ever reach wireless device B 1330B. Preferably, the inversion is temporary, for example clearing inverted rules 1325I after all stale sessions would be known to have timed out, or replacing maintaining inverted rules 1325I until UTC 1310 substitutes the inverted rules 1325I with rules on behalf of wireless device B 1330B, or until a predetermined timeout period has expired.

Figure 14:
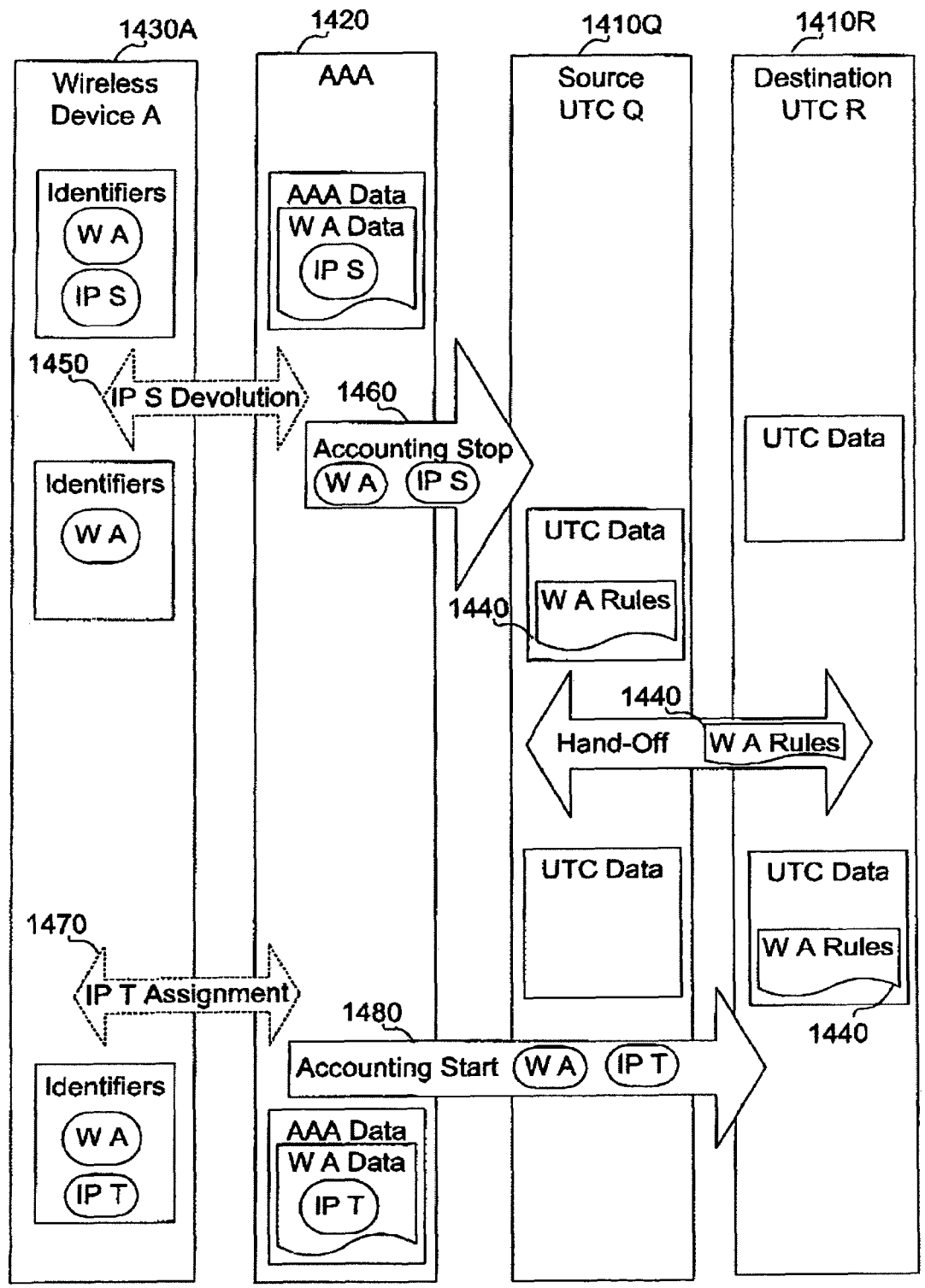
FIG. 14 is an interaction diagram illustrating the interaction when a wireless communication does an inter-UTC handoff, provided in accordance with the present application.

FIG. 14 is an interaction diagram illustrating the technique of inter-UTC hand-off, provided in accordance with the present application. Turning to FIG. 14 a wireless communication device A 1430 with identifier WA is using address S assigned by AAA 1420. AAA 1420 sends a message that substantially indicates that device A data is inactive, such as Accounting Stop 1460, to source UTC 1410Q. IP S devolution 1450, could be as a result of mobility, for example. A hand-off of WA Rules 1440 from UTC Q 1410Q to UTC R 1410R occurs.

Initially source UTC Q 1410Q holds the WA Rules 1440 on behalf of wireless communication device A 1430. After the hand-off, WA Rules 1440 are held at destination UTC R 1410R. When AAA 1420 assigns IP T 1470 to wireless device 1430A, AAA 1420 sends a message that substantially indicates that device A data is active, such as Accounting Start 1480, to UTC R 1410R. Advantageously, UTC R 1410R already has WA Rules 1440 as a result of the hand-off, so wireless device WA 1430A is never left unprotected by its WA Rules 1440. Although not expressly shown in the drawing, other mechanisms than the devolution and re-assignment of addresses may cause the hand-off. For example AAA 1420 may issue hand-off direction orders to UTCs.

Figure 15:
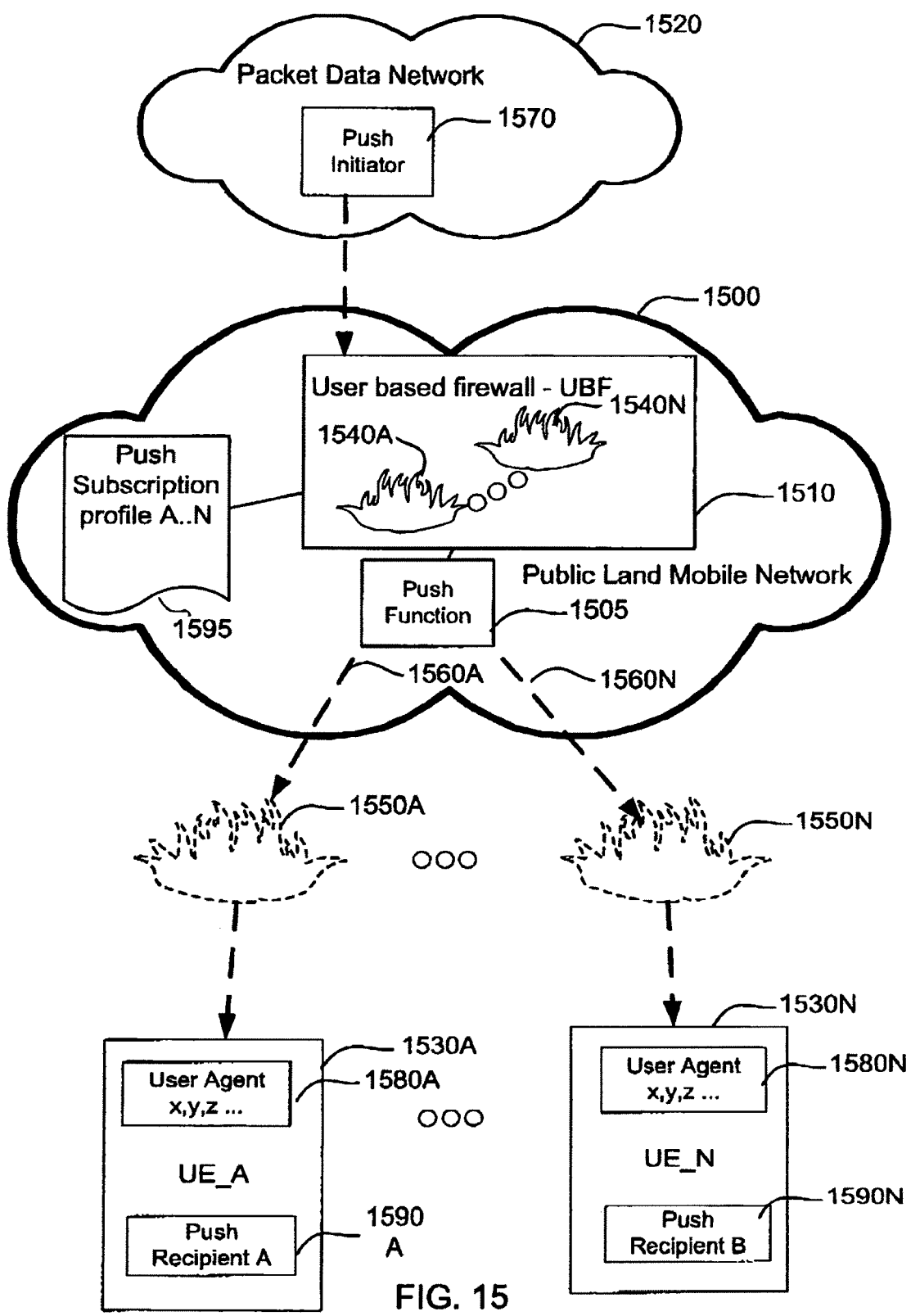
FIG. 15 is a block diagram illustrating a wireless network including an embodiment of a UTC adapted to a 3rd Generation Partnership Project (3GPP) General Packet Radio Service (GPRS) environment, provided in accordance with the present application.

FIG. 15 shows the GPRS embodiment described in the above paragraph in greater detail. Turning now to FIG. 15 and referring both to FIG. 1 and FIG. 15, the Public Land Mobile Network (PLMN) 1500 (a wireless network 100) is the 3GPP network that receives the push data from the push initiator 1570 (which is in the packet data network 120 or 1520) and ensures the delivery of push data to the push recipient (which is in at least one of wireless communication devices 130A-130N or user equipments (UE) 1530A-1530N. The delivery of the push data may involve other networks not explicitly shown in FIG. 1 or FIG. 15. The push function 1505 is the function in the PLMN 1500 that receives the push data from the push initiator 1570. The push function is responsible for delivering the push data to the push recipient 1590A-1590N. The packet data network 1520 is an interface into the PLMN 1500 via IP. User Equipment 1530A-1530N is any one of the wireless communication devices 130A-130N. Operationally, User Based Firewall (UBF) rules or Subscription-Based Firewall (SBF) rules (such as 140A-140N or 1540A-1540N) are persistently stored firewall rules based on the user or subscription rather than the session, and enforced by unsolicited traffic controller 1510 or 110. For example, a subscription-based rule will persist for a particular user or subscription across many IP (or other) sessions, whereas an IP based rule will persist for the duration of the IP session. A subscription may include more than one user, such as for example all users in a corporation. The user (or subscription) based firewall rules may be explicitly defined by the user, the operator, or implicitly defined by UE behavior (for example, solicitation of a service). UE based list of firewall rules operate so as to appear substantially as if each interface had an apparent firewall 1550A-1550N (150A-150N) protecting each user equipment's bearer path 1560A-1560N linking wireless network 1500 or 100 with wireless communication devices 1530A-1530N (130A-130N). It is envisaged that the bearer path may include either or all of: sms, sip, circuit switched, packet switched, trunk service, wlan, broadcast, multicast or any other bearer required to provide a communication service such as voice, push to talk, wap, email, html, chat and the like. The push initiator 1570 is the entity that originates push data and submits it to the push function 1505 for delivery to a push recipient 1590A-1590N. A push initiator may be for example an application providing value added services, such as email or other timely communications. A push user agent 1580A-1580N is any software or device associated with a push recipient that interprets push data to the user of wireless communication devices 130A-130N. This may include textual browsers, voice browsers, search engines, machine or device interface software, and other push user agents, for example. A push recipient is the entity that receives the push data from the Push function and processes or uses it. This is the UE with which the PLMN communicates with and bills to, the user agent with the application level address, and the device, machine or person that uses the push data. An individual user or subscription controls a push recipient. A push subscription profile (PSP) 1595 for each user or subscriber is preferably accessible to the user based firewall (UBF) integral to unsolicited traffic controller 1510 or 110. The PSP is a set of parameters indicating the push recipient's settings and preferences for the push service. This may include an override capability for the wireless carrier to implement a standard set of UBF rules for all Push Recipients (subscribers). For example, this would allow for all users to get WAP push by default without the capability to block it. A similar example is for Broadcast/multicast service.

Figure 16:
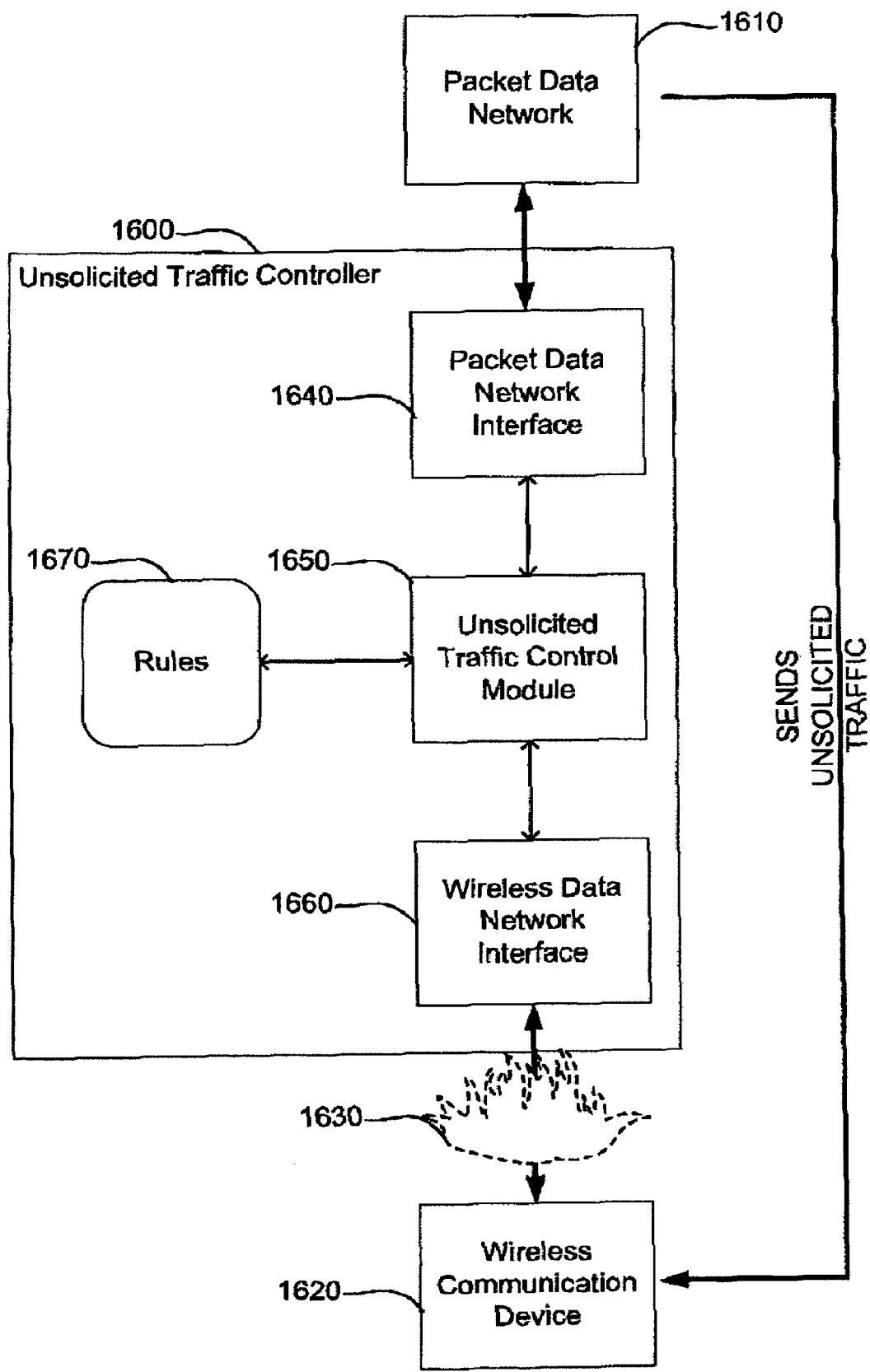
FIG. 16 is a block diagram illustrating an exemplary embodiment of an unsolicited traffic controller apparatus provided in accordance with the present application.

FIG. 16 shows an exemplary embodiment of an unsolicited traffic controller apparatus, provided in accordance with the present application. Packet data network 1610 sends unsolicited traffic destined to wireless communication device. Unsolicited traffic controller 1600 intercepts all traffic sent by packet data network 1610 that is destined for wireless communication device 1620, or other like devices for whom it is delegated authority to control unsolicited traffic. Unsolicited traffic controller 1600 includes a packet data network interface 1640 to receive packets from packet data network, as well as a wireless data network interface 1660 to send packets to the wireless communication device 1620.

Operationally, unsolicited traffic control module 1650 applies rules 1670 on behalf of wireless communication device 1620 to selectively block packets from being sent over wireless data network interface 1660 to wireless communication device 1620 thereby providing an apparent firewall 1630 that substantially prevents packets which are considered unsolicited by wireless communication device 1620 from ever reaching the wireless communication device 1620.

In alternate embodiments, the interfaces 1640 and 1660 may be one way so that they can only receive and transmit respectively, or can be two-way allowing packets to be both transmitted and received.

The embodiments described herein are examples of structures, systems or methods having elements corresponding to elements of this application. This written description may enable those skilled in the art to make and use embodiments having alternative elements that likewise correspond to the elements of this application. The intended scope of the application thus includes other structures, systems or methods that do not differ from the invention as described herein, and further includes other structures, systems or methods with insubstantial differences from the invention as described herein.

We claim:

1. A method for controlling unsolicited traffic between a wireless communication device and a packet data network, the method comprising:
   detecting an incoming data packet destined to the wireless communication device from the packet data network or an originating data packet originating from the wireless communication device destined to the packet data network;
   automatically updating a set of traffic control rules associated with the wireless communication device in response to detection of the incoming data packet or in response to detection of the originating data packet;
   applying the updated set of traffic control rules to subsequent incoming data packets destined to the wireless communication device from the packet data network to identify solicited or unsolicited incoming data packets; and
   blocking transmission of the unsolicited incoming data packets destined to the wireless communication device from the packet data network.

2. The method of claim 1, wherein automatically updating the set of traffic control rules comprises updating a list of solicited traffic, in response to detection of the originating data packet, to include a solicited traffic definition of traffic substantially similar to the originating data packet; and
   wherein applying the updated set of traffic control rules to subsequent incoming data packet comprises determining whether the subsequent data packet is solicited based on a comparison with the solicited traffic definition in the list of solicited traffic; and
   transmitting the subsequent incoming data packet to the wireless communication device if the subsequent packet is determined to be solicited.

3. The method of claim 2, wherein the solicited traffic definition is at least one of an Internet Protocol (IP) address, a port number, and a socket number.

4. The method of claim 1, wherein in response to detection of the incoming data packet destined to the wireless communication device from the packet data network, transmitting the incoming data packet to the wireless communication device; and
   wherein automatically updating the set of traffic control rules comprises updating a list of unsolicited traffic, in response to an explicit message from the wireless communication device, to include a unsolicited traffic definition of traffic substantially similar to the incoming data packet; and
   wherein applying the updated set of traffic control rules to subsequent incoming data packet comprises determining whether the subsequent data packet is unsolicited based on a comparison with the unsolicited traffic definition in the list of unsolicited traffic; and
   blocking transmission of the subsequent incoming data packet to the wireless communication device if the subsequent packet is determined to be unsolicited.

5. The method of claim 4, wherein the unsolicited traffic control definition is at least one of a IP address, a port number, and a socket number.

6. The method of claim 1, wherein in response to detection of the incoming data packet destined to the wireless communication device from the packet data network, transmitting the incoming data packet to the wireless communication device; and
   wherein automatically updating the set of traffic control rules comprises updating a list of unknown traffic to include a unknown traffic definition of traffic substantially similar to the incoming data packet; and
   wherein applying the updated set of traffic control rules to subsequent incoming data packet comprises determining whether the subsequent data packet is unsolicited based on a comparison with the list of unknown traffic; and
   blocking transmission of the subsequent incoming data packet to the wireless communication device if the subsequent packet is determined to be unsolicited.

7. The method of claim 6, wherein the unknown traffic control definition is at least one of a IP address, a port number, and a socket number.

8. The method of claim 6, further comprising:
   automatically updating a list of solicited traffic in the set of traffic control rules, in response to detection of a subsequent originating data packet substantially similar to the incoming data packet, to include a solicited traffic definition corresponding to the unknown traffic definition; and
   automatically clearing the unknown traffic definition from the list of unknown traffic.

9. The method of claim 6, further comprising:
   automatically updating a list of unsolicited traffic in the set of traffic control rules, in response to an explicit message from the wireless communication device, to include a unsolicited traffic definition corresponding to the unknown traffic definition; and
   automatically clearing the unknown traffic definition from the list of unknown traffic.

10. The method of claim 1, wherein in response to detection of the incoming data packet destined to the wireless communication device from the packet data network, automatically updating the set of traffic control rules comprises:
    sending the incoming data packet to a delegate of the wireless communication device to regulate the incoming data packet on behalf of the wireless communication device;
    storing the incoming data packet in a store;
    automatically updating the traffic control rules based on a rule form the delegate;
    applying the updated set of traffic control rules to the stored incoming data packet to determine whether the stored incoming data packet is solicited or unsolicited based on the rule from the delegate.

11. The method of claim 1, further comprising:
    associating the traffic control rules to a first identity of the wireless communication device;
    creating a profile associated with the wireless communication device including the first identity of the wireless communication device in a authentication, authorization, and accounting (AAA) server;
    devolving the first identity of the wireless communication device and sending an accounting stop message from the AAA server when the wireless communication device becomes inactive; and
    storing the traffic control rules associated with the first identity of the wireless communication device in a storage device in the AAA server for later retrieval.

12. The method of claim 11, further comprising:
    assigning a second identity to the wireless communication device;
    sending an accounting start message from the AAA server when the wireless communication device becomes active;

retrieving the stored traffic control rules associated with the first identity of the wireless communication device based on the profile associated with the wireless communication device; and associating the retrieved traffic control rules with the second identity of the wireless communication device.

13. The method of claim 11, further comprising:

assigning the devolved first identity to a second wireless communication device;

inverting the stored set of traffic control rules associated with first identity of the wireless communication device;

sending an accounting start message from the AAA server when the second wireless communication device becomes active; and associating the inverted traffic control rules with the second wireless communication device.

14. The method of claim 13, wherein the first identity and second identity are at least one of International Mobile Station Identity (IMSI), Network Access Identifier (NAI), Mobile Station Internet Services Digital Network Number (MSISDN), and Session Initiation Protocol (SIP) Universal Resource Locator (url).

15. The method of claim 1, wherein the incoming data packet and the originating data packet are at least one of Internet Protocol, voice, email, hyper text transfer protocol, file transfer protocol, multimedia messaging service, and short messaging service.

16. An unsolicited traffic controller (UTC) for controlling unsolicited traffic between a wireless communication device and a packet data network, the UTC comprising:

a packet data network interface for receiving incoming data packets from the packet data network destined to the wireless communication device and for transmitting originating data packets originating from the wireless communication device destined to the packet data network;

a wireless data network interface for transmitting incoming data packets destined to the wireless communication device from the packet data network and for receiving originating data packets originating from the wireless communication device destined to the packet data network;

an unsolicited traffic control module for detecting the incoming data packet and the originating data packet;

the unsolicited traffic control module automatically updating a set of traffic control rules associated with the wireless communication device in response to detection of the incoming data packet or in response to detection of the originating data packet; applying the updated set of traffic control rules to subsequent incoming data packets destined to the wireless communication device from the packet data network to identify solicited or unsolicited incoming data packets; and blocking transmission of the unsolicited incoming data packets destined to the wireless communication device from the packet data network.

17. A wireless communication system comprising:

a wireless communication network including a wireless communication device, a packet data network, and a unsolicited traffic controller (UTC) for controlling unsolicited traffic between the wireless communication device and the packet data network, the UTC comprising:

a packet data network interface for receiving incoming data packets from the packet data network destined to the wireless communication device and for transmitting originating data packets originating from the wireless communication device destined to the packet data network;

a wireless data network interface for transmitting incoming data packets destined to the wireless communication device from the packet data network and for receiving originating data packets originating from the wireless communication device destined to the packet data network;

an unsolicited traffic control module for detecting the incoming data packet and the originating data packet;

the unsolicited traffic control module automatically updating a set of traffic control rules associated with the wireless communication device in response to detection of the incoming data packet or in response to detection of the originating data packet; applying the updated set of traffic control rules to subsequent incoming data packets destined to the wireless communication device from the packet data network to identify solicited or unsolicited incoming data packets; and blocking transmission of the unsolicited incoming data packets destined to the wireless communication device from the packet data network.

18. The wireless communication system of claim 17, wherein the wireless communication network is a Code Division Multiple Access (CDMA) wireless network and wherein the UTC is located in at least one Packet Data Servicing Node (PDSN).

19. The wireless communication system of claim 17, wherein the wireless communication network is a General Packet Radio Service (GPRS) wireless network and wherein the UTC is located in one of a Serving GPRS Support Node (SGSN) and Gateway GPRS Support Node (GGSN).

* * * * *

UNITED STATES PATENT AND TRADEMARK OFFICE
CERTIFICATE OF CORRECTION

PATENT NO.        : 7,684,363 B2                                         Page 1 of 1
APPLICATION NO.   : 12/470896
DATED             : March 23, 2010
INVENTOR(S)       : Wen Zhao et al.

It is certified that error appears in the above-identified patent and that said Letters Patent is hereby corrected as shown below:

Figure 12, third column, "Retreiving" should read --Retrieving--.
    Figure 12, third column, "Retreive" should read --Retrieve--.
    Column 1, line 13, "the benefit U.S." should read --the benefit of U.S.--.
    Column 1, line 67, "other subscriber" should read --other subscribers--.
    Column 2, line 40, "accordance to this" should read --accordance with this--.
    Column 2, line 55, "identify" should read --identity--.
    Column 3, line 4, "identify" should read --identity--.
    Column 3, line 29, "identify" should read --identity--.
    Column 3, line 42, "plurality wireless" should read --plurality of wireless--.
    Column 4, line 27, "device is becomes" should read --device becomes--.
    Column 7, line 1, "an other" should read --another--.
    Column 7, line 35, "FIGS. 7-8 shows an" should read --FIGS. 7-8 show an--.
    Column 8, line 18, "FIG. 11. A wireless" should read --FIG. 11, a wireless--.
    Column 10, line 7, "wap" should read --WAP--.
    Column 12, line 43, "form the delegate" should read --from the delegate--.

Signed and Sealed this

Twenty-ninth Day of June, 2010

David J. Kappos
*Director of the United States Patent and Trademark Office*